US008811677B2

(12) United States Patent
Guillon et al.

(10) Patent No.: US 8,811,677 B2
(45) Date of Patent: Aug. 19, 2014

(54) METHOD OF TRACKING DISCONTINUOUS SEISMIC HORIZONS IN SEISMIC IMAGES

(75) Inventors: Sebastien Guillon, Pau Cedex (FR); Guillaume Zinck, Talence (FR); Marc Donias, Talence (FR); Olivier Lavialle, Talence (FR)

(73) Assignee: Total SA, Paris (FR)

( * ) Notice: Subject to any disclaimer, the term of this patent is extended or adjusted under 35 U.S.C. 154(b) by 155 days.

(21) Appl. No.: 13/604,964

(22) Filed: Sep. 6, 2012

(65) Prior Publication Data

US 2013/0083973 A1    Apr. 4, 2013

(30) Foreign Application Priority Data

Oct. 4, 2011 (FR) ...................... 11 58947

(51) Int. Cl.
*G06K 9/00* (2006.01)
(52) U.S. Cl.
USPC ................................. 382/109; 367/14; 702/5
(58) Field of Classification Search
USPC .............. 382/100, 109; 702/5, 14, 57; 367/14
See application file for complete search history.

(56) References Cited

U.S. PATENT DOCUMENTS

| | | | | |
|---|---|---|---|---|
| 6,771,800 B2* | 8/2004 | Keskes et al. | ................. | 382/109 |
| 6,970,788 B2* | 11/2005 | Keskes et al. | .................. | 702/14 |
| 7,345,951 B2* | 3/2008 | Broto et al. | .................... | 367/53 |
| 2006/0004522 A1* | 1/2006 | Cacas | ............................ | 702/14 |

FOREIGN PATENT DOCUMENTS

FR    2 869 693 A1    11/2005

OTHER PUBLICATIONS

Keresztes et al., "Seismic Fault Detection Based on a Curvilinear Support," Geoscience and Remote Sensing Symposium, 2008. IGARSS 2008. IEEE International, IEEE Piscataway, NJ, USA, Jul. 7, 2008, pp. 839-842.
Keresztes et al., "Seismic fault detection using marked point processes," Image Processing (ICIP), 2009 16th IEEE International Conference on, IEEE, Piscataway, NJ, USA, Nov. 7, 2009, pp. 565-568.
Zinck et al., "Discontinuous seismic horizon tracking based on a poisson equation with incremental dirichlet boundary conditions," Image Processing (ICIP), 2011 18th IEEE International Conference on, IEEE, Sep. 11, 2011, pp. 3385-3388.
Preliminary Search Report and Written Opinion, "Rapport de Recherche Preliminaire, Opinion Ecrite sur la Brevetabilite de l'invention," for FA 757232, FR 1158947, mailed May 15, 2012, 7 pages.

* cited by examiner

*Primary Examiner* — Shefali Goradia
(74) *Attorney, Agent, or Firm* — Patterson Thuente Pedersen, P.A.

(57) ABSTRACT

The invention targets in particular a method for searching for a seismic horizon in a seismic image of the subsoil. The method notably comprises the designation of two points belonging to the horizon sought, the iterative search for the best solution for the equation of the seismic horizon notably by virtue of a breakdown of this solution into two components, a pseudo-continuous component and a jump component.

13 Claims, 6 Drawing Sheets

METHOD OF TRACKING DISCONTINUOUS SEISMIC HORIZONS IN SEISMIC IMAGES

The present invention relates to the field of subsoil seismic image analysis.

It is known practice, notably in oil exploration, to determine the position of oil reservoirs from the results of geophysical measurements performed from the surface or in drilling wells. In the reflection-based seismic technique, these measurements involve the emission into the subsoil of a wave and the measurement of a signal comprising various reflections of the wave on the geological structures being searched. These structures are typically surfaces separating distinct materials, faults, etc. Other measurements are performed from wells. Acoustic waves or an electromagnetic radiation are then sent into the subsoil.

The measurements are processed to reconstruct a model of the subsoil, usually in the form of seismic images, or echographic images. These images can be two-dimensional (seismic sections) or three-dimensional (seismic blocks). A seismic image is made up of pixels whose intensity is representative of a seismic amplitude dependent on local impedance variations.

Geophysicists are used to analyzing such seismic images conveying amplitude information. By visual observation, they can separate areas of the subsoil that have different characteristics in order to determine the structure of the subsoil.

There are automatic methods for extracting structural information from seismic images. In particular, it is known practice to estimate seismic horizons by using a computer to analyze the amplitude gradients in the seismic image. The duly estimated horizons are called "synthesis horizons" in contrast to the horizons determined by manual picking from the images.

One possible method for estimating horizons in a two-dimensional seismic image consists, from a pixel of the image, in searching for the direction in which the local amplitude gradient is minimum. By propagation along this direction, a line representing a synthesis horizon is constructed step by step. If the seismic image is three-dimensional, it is possible to estimate horizons in the form of surfaces transversal to the vertical direction, for example by means of the propagation method described in the French patent no. 2 869 693.

Nevertheless, if the automatic seismic horizon picking is based on the following of continuities in an image or a seismic block, the presence of a discontinuity, such as a fault, may prevent the horizon from being followed or may introduce a bias in the picking of the horizon.

There is thus a need to facilitate the picking of seismic horizons when discontinuities are present.

To this end, the present invention proposes a method for searching for a seismic horizon in a seismic image of the subsoil. This method comprises:

designating two points of respective coordinates $x_1$, $y_1$ and $x_N$, $y_N$ in the seismic image as being two points belonging to the horizon searched, an integer number N of discrete abscissae $x_1, x_2, \ldots, x_N$ being defined between the abscissae $x_1$, $x_N$ of the two designated points;

considering a fault position at a discrete abscissa $x_{n_\alpha}$ where $n_\alpha$ is an integer between 1 and N−1 and a fault amplitude $C_d$ in a discrete domain;

by taking two functions f and $g_0$ which can be derived over the interval $[x_1, x_N]$, initializing a fault amplitude in a continuous domain with the value $C_0 = C_d - [f(x_{n_\alpha+1}) - f(x_{n_\alpha})]$, a pseudo-continuous component $\tilde{\tau}_0(x_n)$ and a jump component $\hat{\tau}_0(x_n)$ defined over the N discrete abscissae according to $\tilde{\tau}_0(x_n) = f(x_n)$ and $\hat{\tau}_0(x_n) = g_0(x_n) + C_0 \cdot H(n - n_\alpha)$, where $H(\cdot)$ designates the Heaviside function;

performing a number of iterations of a sequence of computation steps for an iteration index k initialized at k=0 then incremented by units, the sequence comprising, for an index k:

computing a residue $r_k(x_n) = \nabla \tilde{\tau}_k(x_n) + \nabla g_k(x_n) - p(x_n, \tilde{\tau}_k(x_n) + \hat{\tau}_k(x_n))$, where $\nabla$ designates the gradient operator and $p(x_n, y)$ designates the tangent of an inclination estimated for a position of discrete abscissa $x_n$ and of ordinate y in the seismic image;

solving a Poisson equation $\Delta(\delta \tilde{\tau}_k) = -\text{div}(r_k)$ to determine an update term $\delta \tilde{\tau}_k(x_n)$, with conditions at the Dirichlet limits:

$$\begin{cases} \delta \tilde{\tau}_0(x_1) = y_1 - f(x_1) - g_0(x_1) \\ \delta \tilde{\tau}_0(x_N) = y_N - f(x_N) - g_0(x_N) - C_0 \end{cases}$$

on the first iteration and $$\begin{cases} \delta \tilde{\tau}_k(x_1) = g_{k-1}(x_1) - g_k(x_1) \\ \delta \tilde{\tau}_k(x_N) = g_{k-1}(x_N) - g_k(x_N) + C_{k-1} - C_k \end{cases}$$

on each iteration of index k≥1, where $g_k$ is a function that can be derived over the interval $[x_1, x_N]$;

updating the pseudo-continuous component according to $\tilde{\tau}_{k+1}(x_n) = \tilde{\tau}_k(x_n) + \delta \tilde{\tau}_k(x_n)$;

updating the fault amplitude in the continuous domain according to $C_{k+1} = C_d [\tilde{\tau}_{k+1}(x_{n_\alpha+1}) - \tilde{\tau}_{k+1}(x_{n_\alpha})]$;

updating the jump component according to $\hat{\tau}_{k+1}(x_n) = g_{k+1}(x_n) + C_{k+1} \cdot H(n - n_\alpha)$;

if a final value of the index of iteration k is reached, computing a function $\tau_{n_\alpha, C_d}(x_n)$ representing the ordinate in the seismic image of a horizon estimated as a function of the discrete abscissa $x_n$, from a sum of the pseudo-continuous component and of the jump component; and if the final value of the index of iteration k is not reached, executing the next iteration of the sequence.

For any value of the iteration index k, the functions $g_k$ are taken as being functions that can be derived over the interval $[x_1, x_N]$. The choice of these functions can be free and can depend on the implementation in a particular embodiment. In particular, there is not necessarily any general trend formula for following the functions $g_k$.

The automated picking of a discontinuous seismic horizon relies on a segmentation into two parts of the horizon by a fault assumed to be almost vertical. It is essential to know two points delimiting the horizon to be reconstructed in the seismic image, and to know or make an assumption concerning the place and the amplitude of the discontinuity. The picking is obtained by solving an equation with the non-linear partial derivatives linking the solution searched to the local orientation of the horizon. The method involves an algorithm that is accurate, robust to noise and offers rapid convergence properties. It makes it possible, if necessary, to apply an effective ad-hoc schema to real seismic data with no a priori knowledge as to the place and the amplitude of the discontinuity.

In one embodiment of the method, the function f is chosen as a constant function. It can notably be taken to be equal to $y_1+\beta\cdot(y_N-y_1)$, $\beta$ being a real number chosen between 0 and 1. In this case, each function $g_k$ can also be taken to be constant, in particular of value $-\beta\cdot C_k$.

To solve the Poisson equation, it is possible to use a discrete Fourier transform DFT and its inverse discrete Fourier transform DFT$^{-1}$ according to $$\delta\tilde{\tau}_k = DFT^{-1}\left[-\frac{DFT[div(r_k)]}{DFT[\Delta]}\right].$$

In particular, it is possible to use a discrete sine transform of type I.

Another subject of the invention is a computer program for a subsoil seismic image processing system, the program comprising instructions for implementing the steps of a method as defined above during an execution of the program by a computer of the seismic image processing system.

Other features and advantages of the invention will become more apparent on reading the following description. This is purely illustrative and should be read in light of the appended drawings in which.

Figure 1:
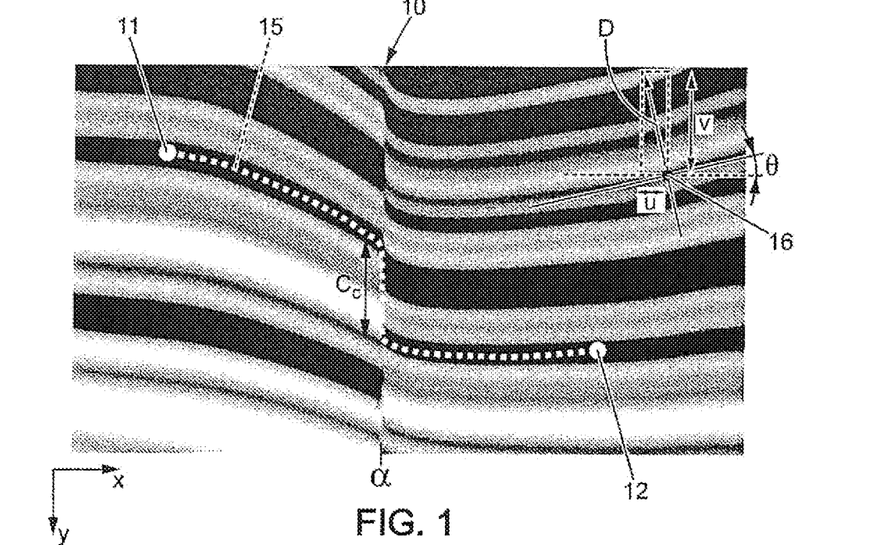
FIG. 1 is a synthesized seismic image portion, in black and white.

With reference to FIG. 1, a seismic image commonly takes the form of a matrix of pixels whose intensity corresponds to a seismic amplitude. The seismic amplitude variations reflect variations of impedance with respect to the propagation of the acoustic waves in the subsoil. The representation is often in two colors (not rendered in the figure), one for the negative amplitudes, the other for the positive amplitudes. The image, when it is two-dimensional, may correspond to a two-dimensional integration of vertical seismic plots. It may also correspond to a vertical cross section in a seismic block obtained by three-dimensional integration of vertical seismic plots.

In the seismic image portion represented by way of example in FIG. 1, the abscissae x correspond to a horizontal direction, whereas the ordinates y can correspond either to the vertical direction if the image is migrated in depth, or to time if the image is migrated in time. Seismic horizons can be observed therein which, in this example, extend on either side of a vertical fault situated at an abscissa $x=\alpha$. A manual picking of horizons can be performed by an operator by observation of the visual textures on the image, even though such a picking can often be ambiguous depending on the complexity of the image, especially of its discontinuities, and the noise that it contains.

It is desirable to perform an automated picking of horizons using a computerized picking technique in order to enhance the effectiveness and productivity in the processing of the seismic images. However, the propagation techniques commonly implemented to perform such an automated picking can be sent in the wrong direction because of the discontinuities generated in particular by faults.

The operator (seismic image interpreter) is typically required to indicate two points 11, 12 of respective coordinates $(x_1, y_1)$ and $(x_N, y_N)$ in the image, assumed to belong to the same horizon on either side of a fault 10. The difficulty is then to determine the most plausible horizon (represented by a dotted line 15 in FIG. 1) passing through these two points 11, 12 given the image data.

Figure 2:
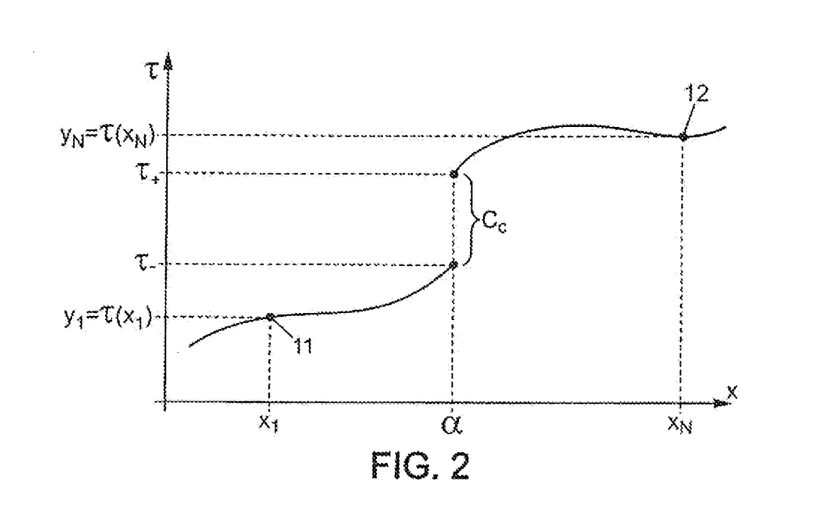
FIG. 2 is a graph illustrating a seismic horizon having a discontinuity and introducing notations used in an embodiment according to the invention.

A seismic horizon having a discontinuity between the two abscissae $x_1$, $x_N$ of the points 11, 12 picked by the operator on either side of the fault 10 can be modeled by a curve illustrated by FIG. 2, representing a function $\tau$ defined for abscissae x contained between the abscissae $x_1$ and $x_N$. The value $\tau(x)$ designates the depth of the seismic horizon at the abscissa x in the case where the image is migrated in depth, or its time position at this abscissa x in the case where the image is migrated in time, with $\tau(x_1)=y_1$ and $\tau(x_N)=y_N$. The function shows an amplitude jump $C_c=\tau_+-\tau_-$ at the abscissa $\alpha\in]x_1, x_N[$, where $$\tau_+ = \lim_{x\to\alpha+} \tau(x)$$

is the limit value of the function $\tau$ when x tends toward $\alpha$ by higher values and $$\tau_- = \lim_{x\to\alpha-} \tau(x)$$

is the limit value of the function $\tau$ when x tends toward $\alpha$ by lower values. The amplitude $C_c$ is the amplitude of the fault 10 in a continuous domain.

The automated horizon picking therefore consists in determining the best function $\tau$ given the seismic image data. These data can be preprocessed to estimate an inclination $\theta(x, y)$ at each position x, y of the seismic image. Conventionally, this preprocessing can, for example, consist in searching, at each position x, y, for the direction $D_{x,y}=(u, v)$ according to which the values of the seismic image exhibit a gradient of maximum amplitude and in representing the inclination $\theta(x, y)$ by its tangent $p(x, y)$, that is to say the opposite of the cotangent of the angle formed by the direction $D_{x,y}$ of maximum gradient in relation to the x axis of the image ($p(x, y)=-u/v$), as schematically illustrated for the point 16 in FIG. 1. Naturally, the inclination values obtained in this way at the discontinuity 10 are not reliable.

For the search for the seismic horizon, it is proposed to solve an equation with partial derivatives iteratively. Except at $x=\alpha$, the function $\tau$ and the tangent p of the local inclination are linked by the following equation $$\nabla\tau(x)=p(x,\tau(x)) \tag{1}$$

where $\nabla$ is the gradient operator. For the purposes of the explanation, the functions t and p are assumed to be respectively of class $C^2$ and $C^1$ except at $x=\alpha$. A function is of class $C^1$ if it is continuous. A function is of class $C^2$ if it is derivable and its derivative is of class $C^1$. Since the equation (1) is nonlinear, the use of an iterative algorithm is necessary to determine the solution searched. Because of the discontinuity, it is proposed to break down the function $\tau$ which is of class $C^2$ over $[x_1, x_N]-\{\alpha\}$ into the sum of an unknown continuous component $\tilde{\tau}$ of class $C^2$ over $[x_1, x_N]$ that satisfies the equation (1) and of a discontinuous jump component î that is constant over $[x_1, \alpha[$ and also constant over $]\alpha, x_N]$:

$$\hat{\tau}(x) = -\beta \cdot C_c \cdot H(\alpha - x) + (1-\beta) \cdot C_c \cdot H(x - \alpha) \quad (2)$$

H being the Heaviside function (H(x)=0 if x≤0 and H(x)=1 otherwise), and $\beta$ being a real parameter, for example chosen between 0 and 1.

Figure 3:
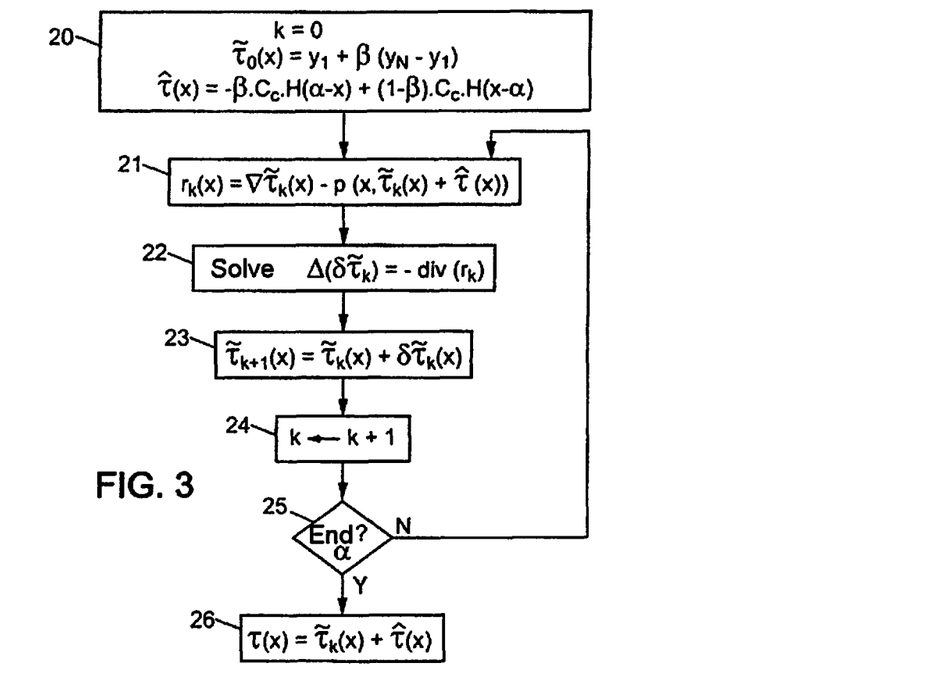
FIG. 3 is a flow diagram of an exemplary iterative solving algorithm in the continuous domain for determining a seismic horizon exhibiting a discontinuity.

Thus, an exemplary iterative solving algorithm is represented in FIG. 3. The object of the algorithm is to compute a series of continuous components $\tilde{\tau}_k$ which effectively converge toward the solution of the equation (1) for an iteration index k=0, 1, 2, . . .

At initialization 20, where the index k is taken to be equal to zero, the algorithm sets the function $\tau_0$ of the series, for example to a constant value:

$$\tilde{\tau}_0(x) = y_1 + \beta \cdot (y_N - y_1) \quad (3)$$

taken between the ordinates $y_1$ and $y_N$ of the points 11, 12 if the parameter 13 is chosen between 0 and 1. The function $\hat{\tau}(x)$ is then set to the value $\hat{\tau}(x) = -\beta \cdot C_c \cdot H(\alpha - x) + (1-\beta) \cdot C_c \cdot H(x - \alpha)$ as described previously. In each iteration of index k of the algorithm, from k=0, the first step 21 consists of an evaluation of the residue:

$$r_k(x) = \nabla \tilde{\tau}_k(x) - p(x, \tilde{\tau}_k(x) + \hat{\tau}(x)) \quad (4)$$

Then, an update function $\delta \tilde{\tau}_k(x)$ is computed in the step 22 by solving the Poisson equation:

$$\Delta \delta \tilde{\tau}_k = -\text{div}(r_k) \quad (5)$$

where $\Delta$ is the Laplacian operator and div the divergence operator. The equation (5) is solved in the step 22 with conditions at the Dirichlet limits over $\delta \tilde{\tau}_k(x_1)$ and $\delta \tilde{\tau}_k(x_N)$, which take into account the amplitude of the discontinuity on the first iteration and ensure the existence of a single solution. Thus:

$$\begin{cases} \delta \tilde{\tau}_0(x_1) = -\beta \cdot (y_N - y_1 - C_c) \\ \delta \tilde{\tau}_0(x_N) = (1-\beta) \cdot (y_N - y_1 - C_c) \end{cases} \text{ for } k=0 \quad (6)$$

$$\begin{cases} \delta \tilde{\tau}_k(x_1) = 0 \\ \delta \tilde{\tau}_k(x_N) = 0 \end{cases} \text{ for } k>0 \quad (7)$$

The component $\tilde{\tau}_{k+1}$ (element k+1 of the series) is computed in the step 23:

$$\tilde{\tau}_{k+1}(x) = \tilde{\tau}_k(x) + \delta \tilde{\tau}_k(x) \quad (8)$$

If (test 24) an end-of-iterations criterion is fulfilled (for example: number of iterations reaching a predefined maximum value, distance between the components $\tilde{\tau}_{k+1}$ and $\tilde{\tau}_k$ below a fixed or adaptive threshold, etc.), the final function $\tau$ is computed in the step 26:

$$\tau(x) = \tilde{\tau}_k(x) + \hat{\tau}(x) \quad (9)$$

Otherwise, the iteration index k is incremented in the step 25 and the next iteration is performed from the abovementioned step 21.

For computer implementation reasons, the solving of the differential equations is performed in a discrete domain, at least for the abscissae x.

Figure 4:
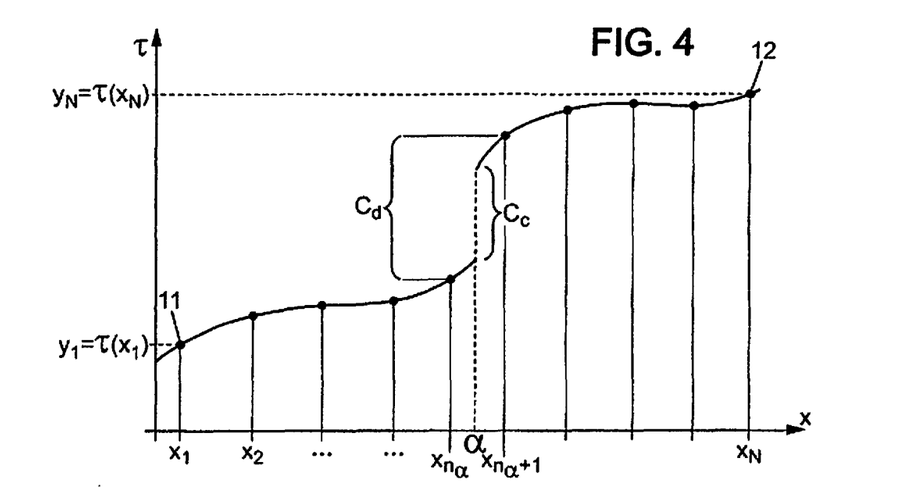
FIG. 4 is a graph illustrating a seismic horizon in the discrete domain, exhibiting a discontinuity.

This is because, as shown in FIG. 4, the seismic horizons are most often sampled in order to be able to be easily analyzed and stored by computer means. Thus, the function $\tau$ cannot be considered to be continuous by pieces. It is a function of a discrete variable.

In this case, the interval $[x_1, x_N]$ is sampled over N points numbered from 1 to N in FIG. 4. The notation $\tau(x_n)$ designates the value of the function $\tau$ at the nth discrete abscissa $x_n$ (1≤n≤N), with $y_1 = \tau(x_1)$ and $y_N = \tau(x_N)$. The real discontinuity $C_c$, at x=$\alpha$, cannot be directly observed on the discretized data. Instead, it is possible to observe the "discrete" discontinuity, or fault amplitude in the discrete domain, denoted $C_d = \tau(x_{n_\alpha+1}) - \tau(x_{n_\alpha})$, the position $\alpha$ of the fault being contained between the discrete abscissae $x_{n_\alpha+1}$ and $x_{n_\alpha}$.

Figure 5:
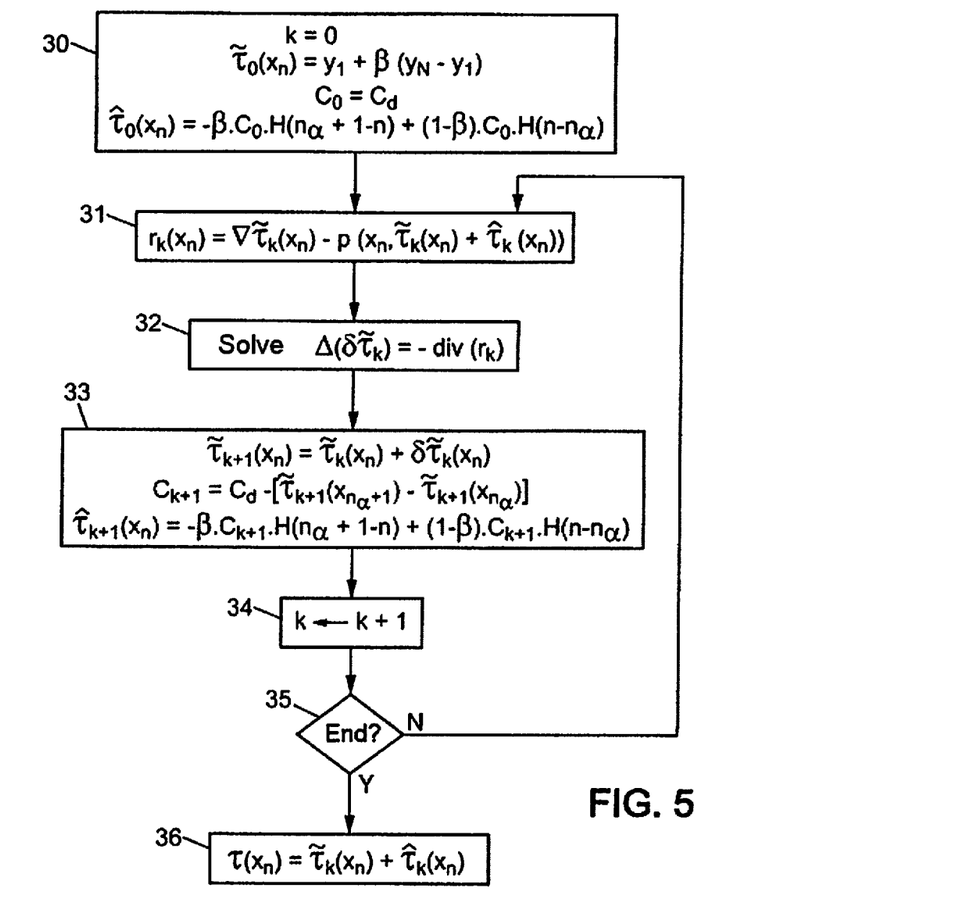
FIG. 5 is a flow diagram of an exemplary iterative solving algorithm in the discrete domain for determining a seismic horizon exhibiting a discontinuity.

A picking algorithm suitable for solving in a discrete domain is presented in FIG. 5. To explain this algorithm, it is initially assumed that the values of $n_\alpha$ and $C_d$ are known after designation of the points 11, 12 of respective coordinates ($x_1$, $y_1$) and ($x_N$, $y_N$) by the operator. Compared with the algorithm of the continuous case presented with reference to FIG. 3, the update terms $\delta \tilde{\tau}(x_{n_\alpha})$ and $\delta \tilde{\tau}(x_{n_\alpha+1})$ have a priori different values, which means that the algorithm has to be adapted for the discrete case. It is in particular necessary to update the jump component $\hat{\tau}_k$ of the function $\tau$ in the course of the iterations, and the estimation $C_k$ of the fault amplitude in the continuous domain, in order to take account of this difference between $\delta \tilde{\tau}(x_{n_\alpha})$ and $\delta \tilde{\tau}(x_{n_\alpha+1})$.

At initialization 30, where the index k is taken to be equal to zero, the algorithm sets the pseudo-continuous component $\tilde{\tau}_0$, an initialization value $C_0$ for the fault amplitude in the continuous domain and the jump component $\hat{\tau}_0$, for example according to:

$$\begin{cases} \tilde{\tau}_0(x_n) = y_1 + \beta \cdot (y_N - y_1) \\ C_0 = C_d \\ \hat{\tau}_0(x_n) = -\beta \cdot C_0 \cdot H(n_\alpha + 1 - n) + (1-\beta) \cdot C_0 \cdot H(n - n_\alpha) \end{cases} \quad (10)$$

with a parameter $\beta$ that can be chosen between 0 and 1. The notation H(n) here designates the value of the Heaviside function for an integer argument n (H(n)=0 if n≤0 and H(n)=1 otherwise).

In each iteration of index k of the algorithm, from k=0, the first step 31 consists once again of an evaluation of the residue:

$$r_k(x_n) = \nabla \tilde{\tau}_k(x_n) - p(x_n, \tilde{\tau}_k(x_n) + \hat{\tau}_k(x_n)) \quad (11)$$

Then, the update function $\delta \tilde{\tau}_k$ is computed in the step 32 by solving the Poisson equation in the discrete domain:

$$\Delta \delta \tilde{\tau}_k = -\text{div}(r_k) \quad (12)$$

with conditions at the Dirichlet limits:

$$\begin{cases} \delta \tilde{\tau}_0(x_1) = -\beta \cdot (y_N - y_1 - C_0) \\ \delta \tilde{\tau}_0(x_N) = (1-\beta) \cdot (y_N - y_1 - C_0) \end{cases} \text{ for } k=0 \quad (13)$$

and $$\begin{cases} \delta \tilde{\tau}_k(x_1) = -\beta \cdot (C_{k-1} - C_k) \\ \delta \tilde{\tau}_k(x_N) = (1-\beta) \cdot (C_{k-1} - C_k) \end{cases} \text{ for } k>0 \quad (14)$$

the parameter $C_k$ for k≥1 having been determined on the preceding iteration.

As an example, the Poisson equation (12) can be solved in a frequency domain in the step 32, by using a method based on discrete Fourier transform (DFT) and inverse discrete Fourier transform (DFT$^{-1}$):

$$\delta\tilde{\tau}_k = DFT^{-1}\left[-\frac{DFT[div(r_k)]}{DFT[\Delta]}\right] \quad (15)$$

The discrete Fourier transform may in particular be a discrete sine transform (DST) of type I, in which case the expression (14) becomes:

$$\delta\tilde{\tau}_k = DST^{-1}\left[-\frac{DST[div(r_k)]}{DST[\Delta]}\right] \quad (16)$$

The step 33 includes the update of the pseudo-continuous component according to:

$$\tilde{\tau}_{k+1}(x_n) = \tilde{\tau}_k(x_n) + \delta\tilde{\tau}_k(x_n) \quad (17)$$

of the fault amplitude in the continuous domain according to:

$$C_{k+1} = C_d - \lfloor \tilde{\tau}_{k+1}(x_{n_\alpha+1}) - \tilde{\tau}_{k+1}(x_{n_\alpha}) \rfloor \quad (18)$$

and of the jump component according to:

$$\hat{\tau}_{k+1}(x_n) = -\beta \cdot C_{k+1} \cdot H(n_\alpha+1-n) + (1-\beta) \cdot C_{k+1} \cdot H(n-n_\alpha) \quad (19)$$

In the step 34, the iteration index k is incremented by one unit.

If (test 35) the end-of-iterations criterion is fulfilled (for example: number of iterations reaching a predefined maximum value, distance between the pseudo-continuous components $\tilde{\tau}_k$ and $\tilde{\tau}_{k+1}$ below a fixed or adaptive threshold, etc.), the final function $\tau$ is computed in the step 36:

$$\tau(x_n) = \tilde{\tau}_k(x_n) + \hat{\tau}_k(x_n) \quad (20)$$

Otherwise, the next iteration is performed from the above-mentioned step 31.

It will be observed that the expression (2) of the jump component $\hat{\tau}$, in the continuous case, can be generalized in the form:

$$\hat{\tau}_k(x) = g_k(x) + C_c \cdot H(x-\alpha) \quad (2')$$

where $g_k$ is any function, of class C$^2$ over the interval $[x_1, x_N]$, chosen arbitrarily for each iteration of index k. The equation (2) corresponds to the particular case where $g_k(x) = -\beta \cdot C_c$ for any integer index k.

In this more general case, the expression (4) of the residue (step 21 of FIG. 3) becomes:

$$r_k(x) = \nabla\tilde{\tau}_k(x) + \nabla g_k(x) - p(x, \tilde{\tau}_k(x) + \hat{\tau}(x)) \quad (4')$$

(the term $\nabla g_k$ is null when $g_k$ is a constant function).

If the initialization of the continuous component $\tilde{\tau}_0$ (step 20 of FIG. 3) is also performed according to any arbitrarily chosen function f of class C$^2$ over the interval $[x_1, x_N]$: $\tilde{\tau}_0(x) = f(x)$, the expression (6)-(7) of the conditions at the Dirichlet limits can be generalized:

$$\begin{cases} \delta\tilde{\tau}_0(x_1) = y_1 - f(x_1) - g_0(x_1) \\ \delta\tilde{\tau}_0(x_N) = (y_N - C_c) - f(x_N) - g_0(x_N) \end{cases} \text{ for } k=0 \quad (6')$$

$$\begin{cases} \delta\tilde{\tau}_k(x_1) = g_{k-1}(x_1) - g_k(x_1) \\ \delta\tilde{\tau}_k(x_N) = g_{k-1}(x_N) - g_k(x_N) \end{cases} \text{ for } k>0 \quad (7')$$

This more general form of the algorithm (with any functions f and $g_k$) can also be transposed to the case of solving in the discrete domain. This is what is represented in FIG. 6.

Figure 6:
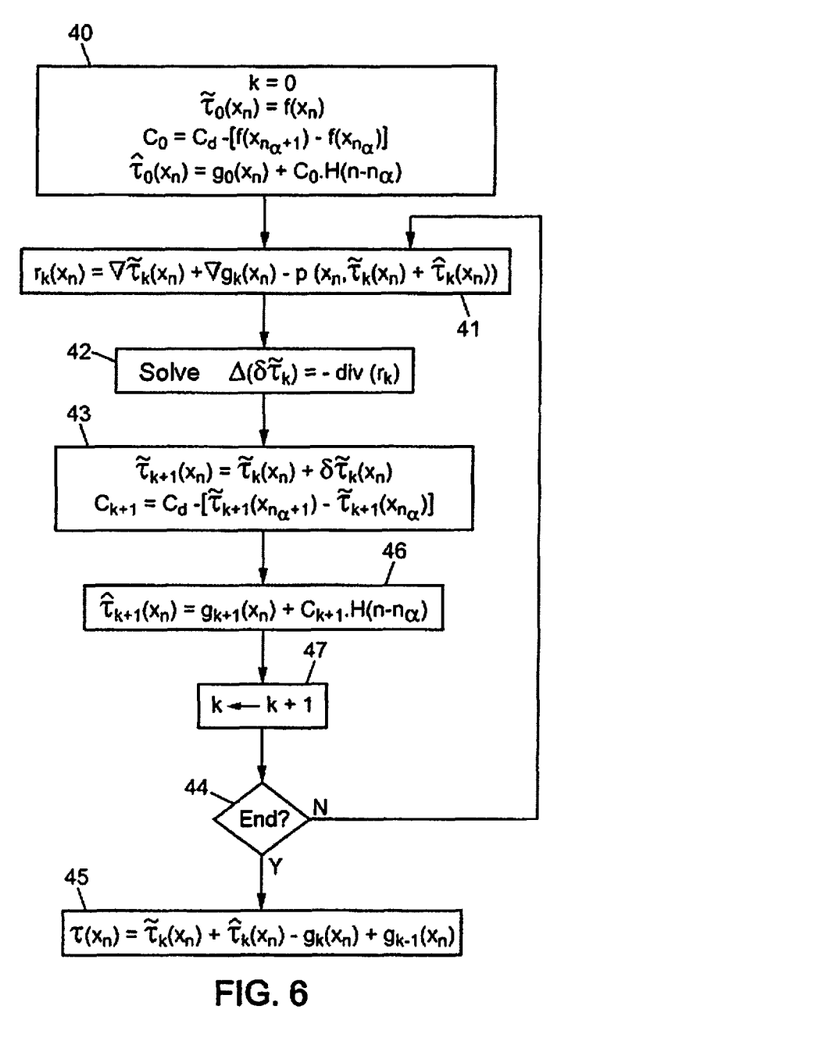
FIG. 6 is a flow diagram of a generalized iterative solving algorithm in the discrete domain for determining a seismic horizon exhibiting a discontinuity.

At initialization 40, where the index k is taken to be equal to zero, the generalized algorithm of FIG. 6 sets the pseudo-continuous component $\tilde{\tau}_0$, the initialization value $C_0$ for the fault amplitude in the continuous domain and the jump component $\hat{\tau}_0$ according to:

$$\begin{cases} \tilde{\tau}_0(x_n) = f(x_n) \\ C_0 = C_d - (f(x_{n_\alpha+1}) - f(x_{n_\alpha})) \\ \hat{\tau}_0(x_n) = g_0(x_n) + C_0 \cdot H(n-n_\alpha) \end{cases} \quad (10')$$

In each iteration of index k of the algorithm, from k=0, the first step 41 consists of the evaluation of the residue according to:

$$r_k(x_n) = \nabla\tilde{\tau}_k(x_n) - \nabla g_k(x_n) - p(x_n, \tilde{\tau}_k(x_n) + \hat{\tau}_k(x_n)) \quad (11')$$

Then, the update function $\delta\tilde{\tau}_k$ is computed in the step 42 of solving the Poisson equation in the discrete domain (12) with conditions at the Dirichlet limits, for which the expression is here:

$$\begin{cases} \delta\tilde{\tau}_0(x_1) = y_1 - f(x_1) - g_0(x_1) \\ \delta\tilde{\tau}_0(x_N) = y_N - f(x_N) - g_0(x_N) - C_0 \end{cases} \quad (13')$$

on the first iteration (k=0), and:

$$\begin{cases} \delta\tilde{\tau}_k(x_1) = g_{k-1}(x_1) - g_k(x_1) \\ \delta\tilde{\tau}_k(x_N) = g_{k-1}(x_N) - g_k(x_N) + C_{k-1} - C_k \end{cases} \quad (14')$$

on the subsequent iterations (k=0).

The step 43 includes the update of the pseudo-continuous component according to (17) of the fault amplitude in the continuous domain according to (18).

Furthermore, the jump component is updated in the step 46 according to:

$$\hat{\tau}_{k+1}(x_n) = g_{k+1}(x_n) + C_{k+1} \cdot H(n-n_\alpha) \quad (19')$$

then the iteration index k is incremented by one unit in the step 47

If (test 44) the iteration index k has reached its maximum value denoted K−1, the final function $\tau$ is computed in the step 45 from the sum of the pseudo-continuous component and of the jump component, for example according to:

$$\tau(x_n) = \tilde{\tau}_k(x_n) + \hat{\tau}_k(x_n) - g_k(x_n) + g_{k-1}(x_n) \quad (20')$$

The test 44 may be similar to the test 35 of FIG. 5. One possibility is to focus this test on a comparison of the previous estimation $C_k$ of the fault amplitude with the new estimation $C_{k+1}$ taking into account the local slope of function $\tilde{\tau}_{k+1}$. It is also possible to predefine the total number of iterations K.

FIG. 5 can be seen as a particular case of FIG. 6 in which the function f is constant: $f(x) = y_1 + \beta(y_N - y_1)$, and each function $g_k$ is also constant: $g_k(x) = -\beta \cdot C_k$.

Figure 7:
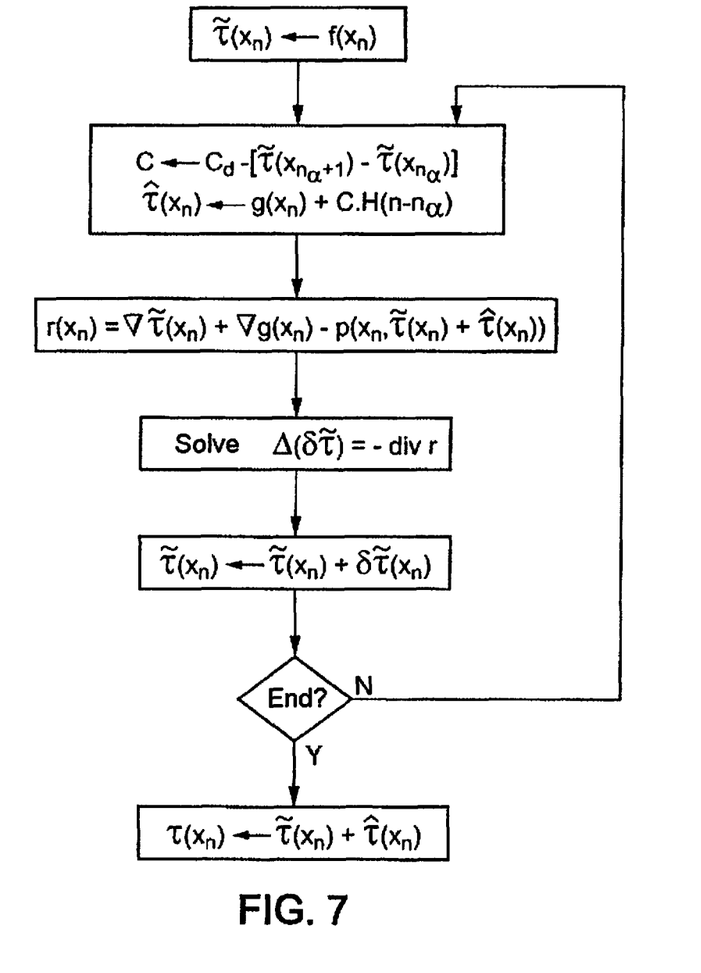
FIG. 7 is a flow diagram of an exemplary solving algorithm equivalent to that of FIG. 6, in which the indices of iterations k are not explicitly shown.

In practice, it is not essential to keep in memory all the values computed during the successive iterations of index k. FIG. 7 thus represents a flow diagram of a solving algorithm equivalent to that of FIG. 6, in which the iteration indices k are no longer involved. The function g can be different from one iteration to another, for example $g = -\beta \cdot C$.

Hereinafter, $\tau_{n_\alpha, C_d}$ is used to denote the function $\tau$ finally estimated in the step 36 or 45 when the values of the discrete position $n_\alpha$ of the fault and its amplitude $C_d$ are taken in a discrete domain.

The values to be retained for the pair $(n_\alpha, C_d)$ can be supplied as being assumed known or, more commonly, they can be unknown a priori. In this case, a procedure for searching for the best pair can be undertaken, for example one of those described hereinbelow.

One possible procedure comprises the evaluation of a consistency criterion $c(n_\alpha, C_d)$ from the seismic image and from the function $\tau_{n_\alpha, C_d}$ obtained at the end of K iterations. A number of candidates for the pair $(n_\alpha, C_d)$ can be considered in succession, and the one for which the consistency criterion proves optimum can be retained.

Figure 8:
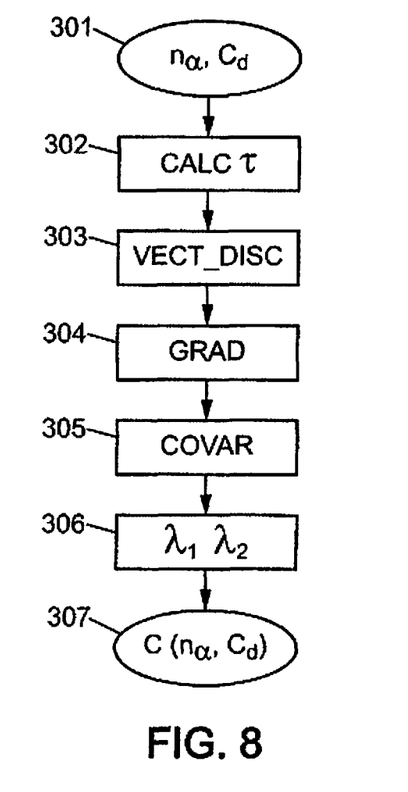
FIG. 8 shows a flow diagram of an exemplary method for searching for a seismic horizon implementing one of the algorithms illustrated previously.

With reference to FIG. 8, the method computes (step 302) the function $\tau$, for example according to the method presented by FIG. 5, 6 or 7, on submission (step 301) of the initial values $(n_\alpha, C_d)$.

Once the seismic horizon line is defined by this function $\tau$, a vector $\vec{u}$ is defined (step 303) as being the vector representing the discontinuity, that is to say $\vec{u} = [(n_\alpha, \tau(n_\alpha)), (n_\alpha+1, \tau(n_\alpha+1))]$. Depending on the discretization of the workspace, a number of points can be defined along this vector. As an illustration, L points are assumed to be able to be defined, with L being a strictly positive integer.

At each point (out of these L points), a gradient vector $\overline{(x_i, y_i)}$ of the complete seismic image is computed (step 304), with $i \in [1 \ldots L]$ integer.

A covariance matrix $\upsilon$ of this gradient field estimated over L points is then computed (step 305) as being:

$$\upsilon = \begin{bmatrix} \text{var}(X) & \text{cov}(X, Y) \\ \text{cov}(X, Y) & \text{var}(Y) \end{bmatrix},$$

where cov is the covariance operator and var the variance operator.

The specific values $\lambda_1$ and $\lambda_2$ of this matrix $\upsilon$ are then computed (step 306). Finally, the consistency value $c(n_\alpha, C_d)$ is defined as being $$\frac{|\lambda_1 - \lambda_2|}{\lambda_1 + \lambda_2}$$

(step 307).

It is possible in one embodiment to test all the possible pairs of values $(n_\alpha, C_d)$ in a given space, possibly discretized. For example, it is possible to test 20 values of $C_d$ distributed uniformly in the segment $[0; 2|\tau(x_1) - \tau(x_N)|]$ and with $n_\alpha$ contained within $[1 \ldots N]$.

Ultimately, the pair of values $(n_\alpha, C_d)$ retained is the one for which the consistency value $c(n_\alpha, C_d)$ is minimum out of all the pairs tested. Specifically, if the specific values are close, this means in practice that the vector $\vec{u}$ is positioned over a discontinuity.

It is also possible to carry out the method by considering that $C_d$ is constant and takes for example the value $|\tau(x_1) - \tau(x_N)|$. Thus, a minimization of $c(n_\alpha, C_d)$ is performed by having $n_\alpha$ vary while $C_d$ does not vary. Then, once the value of $n_\alpha$ that makes it possible to minimize $c(n_\alpha, C_d)$ is selected, the method is performed again by considering that $n_\alpha$ is constant and that $C_d$ varies.

This adaptation makes it possible to optimize the computation time and the time to determine the optimum pair $(n_\alpha, C_d)$.

Furthermore, it is found that the convergence toward zero of the incremental conditions $|C_{k+1} - C_k|$ is all the faster when the hypothesis concerning $C_d$ is close to the real value. Thus, an ad hoc method for detecting the discontinuity parameters may consist, initially, in evaluating the optimum parameter $C_d$ for a certain number of possible values of $n_\alpha$.

It is therefore possible to envisage, for example, three hypotheses for the parameter $C_d$ that are centered on an a priori value $C_0$ and evenly spaced apart by a pitch $h_C$. The horizon following algorithm presented in FIG. 5, 6 or 7 is then implemented for a small number of iterations K (2 or 3). The amplitude $C_d$ for which the difference $|C_{k+1} - C_k|$ is minimum is then substituted for $C_0$. The method can be repeated M times by dividing the pitch $h_C$ by 2 so as to achieve a satisfactory accuracy.

Obviously, the present invention is not limited to the embodiments described above by way of examples; it extends to other variants.

For example, the consistency value $c(n_\alpha, C_d)$ can be computed in a way that is different from those mentioned above. The object of this computation is to find a decorrelation between the vertical gradient and the horizontal gradient.

The method which has just been described is typically implemented in a computer or a workstation in which a processor executes the above steps under the control of a program, the instructions of which are executed by the processor on seismic images loaded from a storage memory such as a hard disk.

The invention claimed is:

1. A method for searching for a seismic horizon in a seismic image of the subsoil, the method comprising:

designating two points of respective coordinates $x_1, y_1$ and $x_N, y_N$ in the seismic image as being two points belonging to the horizon sought, an integer number N of discrete abscissae $x_1, x_2, \ldots, x_N$ being defined between the abscissae $x_1, x_N$ of the two designated points;

considering a fault position at a discrete abscissa $x_{n_\alpha}$ where $n_\alpha$ is an integer between 1 and N−1 and a fault amplitude $C_d$ in a discrete domain;

by taking two functions f and $g_0$ which can be derived over the interval $[x_1, x_N]$, initializing a fault amplitude in a continuous domain with the value $C_0 = C_d - [f(x_{n_\alpha+1}) - f(x_{n_\alpha})]$, a pseudo-continuous component $\tilde{\tau}_0(x_n)$ and a jump component $\hat{\tau}_0(x_n)$ defined over the N discrete abscissae according to $\tilde{\tau}_0(x_n) = f(x_n)$ and $\hat{\tau}_0(x_n) = g_0(x_n) + C_0 \cdot H(n - n_\alpha)$, where $H(\cdot)$ designates the Heaviside function;

performing a number of iterations of a sequence of computation steps for an iteration index k initialized at k=0 then incremented by units, the sequence comprising, for an index k:

computing a residue $r_k(x_n) = \nabla \tilde{\tau}_k(x_n) + \nabla g_k(x_n) - p(x_n, \tilde{\tau}_k(x_n) + \hat{\tau}_k(x_n))$, where $\nabla$ designates the gradient operator and $p(x_n, y)$ designates the tangent of an inclination estimated for a position of discrete abscissa $x_n$ and of ordinate y in the seismic image;

solving a Poisson equation $\Delta(\delta\tilde{\tau}_k) = -\text{div}(r_k)$ to determine an update term $\delta\tilde{\tau}_k(x_n)$, with conditions at the Dirichlet limits:

$$\begin{cases} \delta\tilde{\tau}_0(x_1) = y_1 - f(x_1) - g_0(x_1) \\ \delta\tilde{\tau}_0(x_N) = y_N - f(x_N) - g_0(x_N) - C_0 \end{cases}$$

on the first iteration and $$\begin{cases} \delta\tilde{\tau}_k(x_1) = g_{k-1}(x_1) - g_k(x_1) \\ \delta\tilde{\tau}_k(x_N) = g_{k-1}(x_N) - g_k(x_N) + C_{k-1} - C_k \end{cases}$$

on each iteration of index $k \geq 1$, where $g_k$ is a function that can be derived over the interval $[x_1, x_N]$;
updating the pseudo-continuous component according to $$\tilde{\tau}_{k+1}(x_n) = \tilde{\tau}_k(x_n) + \delta\tilde{\tau}_k(x_n);$$

updating the fault amplitude in the continuous domain according to $$C_{k+1} = C_k - [\tilde{\tau}_{k+1}(x_{n_\alpha+1}) - \tilde{\tau}_{k+1}(x_{n_\alpha})];$$

updating the jump component according to $$\tilde{\tau}_{k+1}(x_n) = g_{k+1}(x_n) + C_{k+1} \cdot H(n - n_\alpha);$$

if a final value of the iteration index k is reached, computing a function $\tau_{n_\alpha, C_d}(x_n)$ representing the ordinate in the seismic image of a horizon estimated as a function of the discrete abscissa $x_n$, from a sum of the pseudo-continuous component and of the jump component; and if the final value of the iteration index k is not reached, executing the next iteration of the sequence.

2. The method according to claim 1, in which the function f is chosen as a constant function.

3. The method according to claim 2, in which the function f is taken to be equal to $y_1 + \beta \cdot (y_N - y_1)$, $\beta$ being a real number chosen between 0 and 1.

4. The method according to claim 3, in which each function $g_k$ is chosen as a constant function of value $-\beta \cdot C_k$.

5. The method according to claim 1, in which each function $g_k$ is chosen as a constant function.

6. The method according to claim 1, in which the solving of the Poisson equation uses a discrete Fourier transform DFT and its inverse discrete Fourier transform $DFT^{-1}$ according to $$\delta\tilde{\tau}_k = DFT^{-1}\left[-\frac{DFT[\text{div}(r_k)]}{DFT[\Delta]}\right].$$

7. The method according to claim 6, in which the discrete Fourier transform is a discrete sine transform of type I.

8. The method according to claim 1, also comprising:
evaluating a consistency criteron for the considered values of the discrete abscissa $n_\alpha$ and of the fault amplitude $C_d$ in the discrete domain.

9. The method according to claim 8, in which the evaluation of the consistency criterion comprises:
computing the specific values $\lambda_1$ and $\lambda_2$ of a covariance matrix of a gradient field estimated from the seismic image at a given number of points of the segment $[(n_\alpha, \tau_{n_\alpha, C_d}(n_\alpha)), (n_\alpha+1, \tau_{n_\alpha, C_d}(n_\alpha+1))]$; and evaluating the consistency criterion $c(n_\alpha, C_d)$ for the considered values of the discrete abscissa $n_{60}$ and of the fault amplitude $C_d$ in the discrete domain according to $$c(n_\alpha, C_d) = \frac{|\lambda_1 - \lambda_2|}{\lambda_1 + \lambda_2}.$$

10. The method according to claim 8, also comprising:
identifying a pair of values of the discrete abscissa $n_\alpha$ and of the fault amplitude $C_d$ in the discrete domain for which the consistency criterion is optimum; and
picking a horizon defined by the function $\tau_{n_\alpha, C_d}(n)$ computed for the pair giving the optimum consistency criterion.

11. The method according to claim 1, also comprising:
evaluating a first consistency criterion for the considered values of the discrete abscissa $n_\alpha$, the fault amplitude $C_d$ in the discrete domain being fixed;
identifying the value of the discrete abscissa $n_\alpha$ in the discrete domain for which the first consistency criterion is optimum;
evaluating a second consistency criterion for the considered values of the fault amplitude $C_d$ in the discrete domain, the value of the discrete abscissa $n_\alpha$ being the identified value of $n_\alpha$;
identifying the value of the fault amplitude $C_d$ in the discrete domain for which the second consistency criterion is optimum.

12. The method according to claim 1, also comprising:
a) evaluating a consistency criterion for a set of values out of the considered values of the discrete abscissa $n_\alpha$ and values of the fault amplitude $C_d$ in the discrete domain spaced apart by a pitch $h_c$ and centered on a central amplitude value $C_{d0}$;
b) computing $|C_K - C_{K-1}|$ for a number K of iterations;
c) reiterating the steps a) to b) M times,
by replacing the central amplitude value $C_{d0}$ with a fault amplitude value for which the value of $|C_{K+1} - C_K|$ is minimum out of the values of the fault amplitude $C_d$ evaluated, and
by replacing the distance value of $h_c$ with a value less than the distance value on the preceding iteration; and
d) identifying the value of the discrete abscissa $n_\alpha$ out of the considered values of the discrete abscissa for which the consistency criterion is optimum, the fault amplitude value $C_d$ being a value for which the value of $|C_{K+1} - C_K|$ is minimum out of the values of the fault amplitude $C_d$ evaluated in the iteration M.

13. A non-transitory computer readable storage medium, having stored thereon a computer program comprising program instructions, the computer program being loadable into a data-processing unit and adapted to cause the data-processing unit to carry out, during an execution of the program by a computer of the seismic image processing system, the following steps:
receiving two designated points of respective coordinates $x_1, y_1$ and $x_N, Y_N$ in the seismic image as being two points belonging to the horizon sought, an integer number N of discrete abscissae $x_1, x_2, \ldots, x_N$ being defined between the abscissae $x_1, x_N$ of the two designated points;
considering a fault position at a discrete abscissa $x_{n_\alpha}$ where $n_\alpha$ is an integer between 1 and N−1 and a fault amplitude $C_d$ in a discrete domain;

by taking two functions f and $g_0$ which can be derived over the interval $[x_1, x_N]$, initializing a fault amplitude in a continuous domain with the value $C_0 = C_d - [f(x_{n_\alpha})]$, a pseudo-continuous component $\tilde{\tau}_0(x_n)$ and a jump component $\hat{\tau}_0(x_n)$ defined over the N discrete abscissae according to $\tilde{\tau}_0(x_n) = f(x_n)$ and $\hat{\tau}_0(x_n) = g_0(x_n) + C_0 \cdot H(n - n_\alpha)$, where $H(\cdot)$ designates the Heaviside function;

performing a number of iterations of a sequence of computation steps for an iteration index k initialized at k = 0 then incremented by units, the sequence comprising, for an index k:

computing a residue $r_k(x_n) = \nabla \tilde{\tau}_k(x_n) + \nabla g_k(x_n) - p(x_n, \tilde{\tau}_k(x_n) + \hat{\tau}_k(x_n))$, where $\nabla$ designates the gradient operator and $p(x_n, y)$ designates the tangent of an inclination estimated for a position of discrete abscissa $x_n$ and of ordinate y in the seismic image;

solving a Poisson equation $\Delta(\delta\tilde{\tau}_k) = -\text{div}(r_k)$ to determine an update term $\delta\tilde{\tau}_k(x_n)$, with conditions at the Dirichlet limits:

$$\begin{cases} \delta\tilde{\tau}_0(x_1) = y_1 - f(x_1) - g_0(x_1) \\ \delta\tilde{\tau}_0(x_N) = y_N - f(x_N) - g_0(x_N) - C_0 \end{cases}$$

on the first iteration and $$\begin{cases} \delta\tilde{\tau}_k(x_1) = g_{k-1}(x_1) - g_k(x_1) \\ \delta\tilde{\tau}_k(x_N) = g_{k-1}(x_N) - g_k(x_N) + C_{k-1} - C_k \end{cases}$$

on each iteration of index $k \geq 1$, where $g_k$ is a function that can be derived over the interval $[x_1, x_N]$;

updating the pseudo-continuous component according to $\tilde{\tau}_{k+1}(x_n) = \tilde{\tau}_k(x_n) + \delta\tilde{\tau}_k(x_n)$;

updating the fault amplitude in the continuous domain according to $C_{k+1} = C_d - [\tilde{\tau}_{k+1}(x_{n_\alpha+1}) \tilde{\tau}_{k+1}(x_{n_\alpha})]$;

updating the jump component according to $\hat{\tau}_{k+1}(x_n) = g_{k+l}(x_n) + C_{k+1} \cdot H(n - n_\alpha)$;

if a final value of the iteration index k is reached, computing a function $\tau_{n_\alpha c_{\hat{k}}}(x_n)$ representing the ordinate in the seismic image of a horizon estimated as a function of the discrete abscissa $x_n$, from a sum of the pseudo-continuous component and of the jump component; and if the final value of the iteration index k is not reached, executing the next iteration of the sequence.

* * * * *